US007105943B2

(12) United States Patent
Willats et al.

(10) Patent No.: US 7,105,943 B2
(45) Date of Patent: Sep. 12, 2006

(54) INSIDE DOOR RELEASE MECHANISM

(75) Inventors: Robin Willats, Preston (GB); John Emson, West Bromwich (GB); Sidney Fisher, Redditch (GB); Gurbinder Kalsi, Oldbury (GB); Nigel Spurr, Solihull (GB); Jean Didier, Anould (FR); Alan Dixon, Chester (GB); Stephen Drysdale, Northampton (GB)

(73) Assignee: ArvinMeritor Light Vehicle Systems (UK) Ltd., Stirchley (GB)

( * ) Notice: Subject to any disclaimer, the term of this patent is extended or adjusted under 35 U.S.C. 154(b) by 453 days.

(21) Appl. No.: 10/246,871

(22) Filed: Sep. 19, 2002

(65) Prior Publication Data

US 2003/0132667 A1 Jul. 17, 2003

(30) Foreign Application Priority Data

Sep. 20, 2001 (GB) ................................ 0122633.1

(51) Int. Cl.
*B60L 1/00* (2006.01)

(52) U.S. Cl. ........................ 307/10.1; 307/9.1; 70/277; 70/271; 340/5.72

(58) Field of Classification Search .................. 70/277, 70/271; 307/9.1, 10.1; 340/5.72
See application file for complete search history.

(56) References Cited

U.S. PATENT DOCUMENTS

| | | | | |
|---|---|---|---|---|
| 4,200,167 | A | | 4/1980 | Cockman, Jr. |
| 4,422,521 | A | * | 12/1983 | Mochida ..................... 180/271 |
| 4,674,230 | A | * | 6/1987 | Takeo et al. .................... 49/32 |
| 5,468,042 | A | * | 11/1995 | Heinrichs et al. ........ 296/146.4 |
| 5,973,611 | A | * | 10/1999 | Kulha et al. ............... 340/5.62 |

FOREIGN PATENT DOCUMENTS

| | | | | |
|---|---|---|---|---|
| DE | 1941154 | | | 3/1971 |
| DE | 19816736 | A1 | * | 10/1999 |
| DE | 198 48 449 | C1 | | 1/2000 |
| DE | 100 08 515 | A1 | | 8/2001 |

OTHER PUBLICATIONS

European Search Report for European Application No. EP02255707, Oct. 15, 2004, 2 pgs.

* cited by examiner

*Primary Examiner*—Brian Sircus
*Assistant Examiner*—Daniel Cavallari
(74) *Attorney, Agent, or Firm*—Barnes & Thornburg LLP

(57) ABSTRACT

An inside door release mechanism for a vehicle comprises first and second inputs arranged to be mounted in a mutually spaced relationship on a door inner face and an output to a latch wherein the mechanism is so constructed and arranged to be capable of causing the latch to be unlatched when both inputs are actuated simultaneously.

14 Claims, 2 Drawing Sheets

INSIDE DOOR RELEASE MECHANISM

This application claims priority to United Kingdom (GB) patent application number 0122633.1 filed on Sep. 20, 2001.

BACKGROUND OF INVENTION

The present invention relates to an inside door release mechanism. More particularly, the present invention relates to an inside door release mechanism for a vehicle.

Vehicle doors, in particular vehicle passenger doors are provided with a separate inside door engagement means such as a pull handle and inside release means such as an inside release handle. The use of two separate components for these functions increases the part count and door assembly time, and hence the overall assembly cost. It also restricts the design freedom of the inside door trim upon which these components are typically mounted.

It is known to fit power unlatching systems to vehicles. Some systems merely require a switch to be pressed in order to send an unlatching signal to a corresponding door latch. However, there is a risk of accidental actuation if such switches are mounted at an accessible location in the vehicle interior. This is dangerous for the vehicle occupants, particularly if the vehicle is in motion, since they risk falling out of the vehicle.

SUMMARY OF INVENTION

The present invention seeks to overcome or at least mitigate the aforesaid problems.

One aspect of the present invention is an inside door release mechanism for a vehicle comprising first and second input means arranged to be mounted in a mutually spaced relationship on a door inner face and a latch wherein the mechanism is so constructed and arranged to cause the latch to be unlatched when both input means are actuated simultaneously.

BRIEF DESCRIPTION OF THE DRAWINGS

Embodiments of the present invention will now be described, by way of example only, with reference to the accompanying drawings in which.

DETAILED DESCRIPTION OF THE PREFERRED EMBODIMENT

Figure 1:
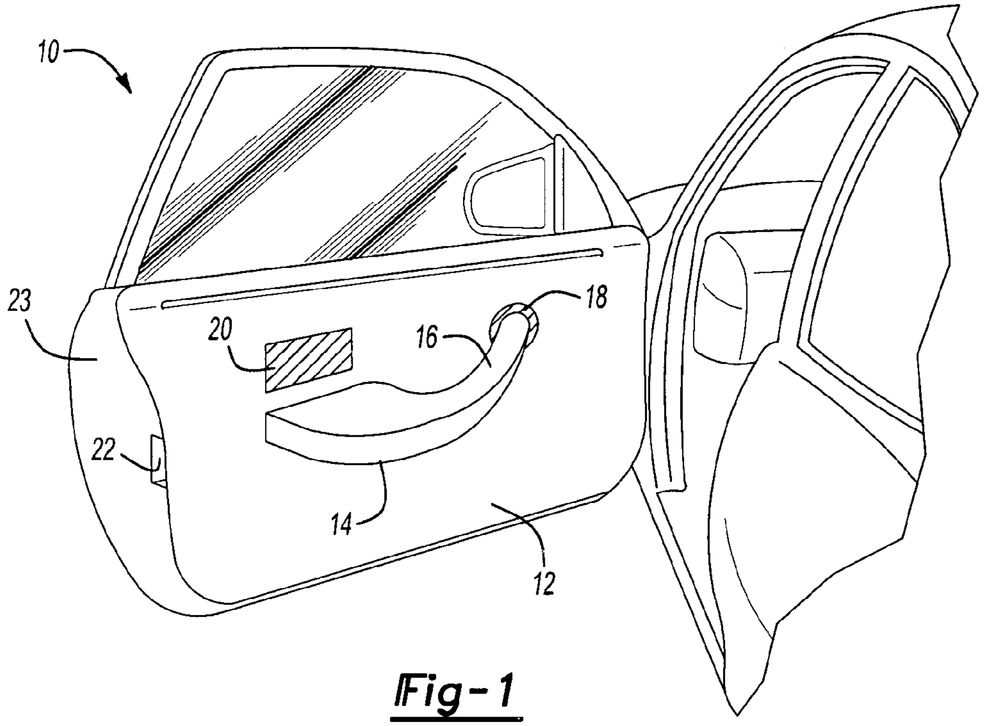
FIG. 1 is a perspective view of an inner face of a door incorporating the mechanism of the present invention.

Referring to FIG. 1, a vehicle side passenger door 10 is shown and comprises an interior trim panel 12 having an arm rest 14 mounted thereon. A handle portion 16 is integrally provided with the arm rest 14 and a strain gauge 18 (hereinafter referred to as the handle strain gauge) is provided to mount the front of the handle 16 to the trim panel 12 such that pulling on the handle 16 produces an output, as described in greater detail below. A further strain gauge 20 in the form of a panel (hereinafter referred to as the trim strain gauge) is mounted on the trim panel 12 above and towards the rear of the arm rest portion 14 such that pressing thereon produces an output.

Gauge 20 is located such that if a vehicle user grasps handle 16 and rests his/her arm on the upper face of arm rest 14 the elbow or lower arm will contact the strain gauge panel 20. Although the gauges 18 and 20 are visible in FIG. 1, they may in alternative embodiments be hidden for aesthetic reasons. In this embodiment, the strain gauges 18, 20 comprise first and second input means of door inner release means.

A power door latch 22 is mounted on the rear face 23 of the door.

Figure 2:
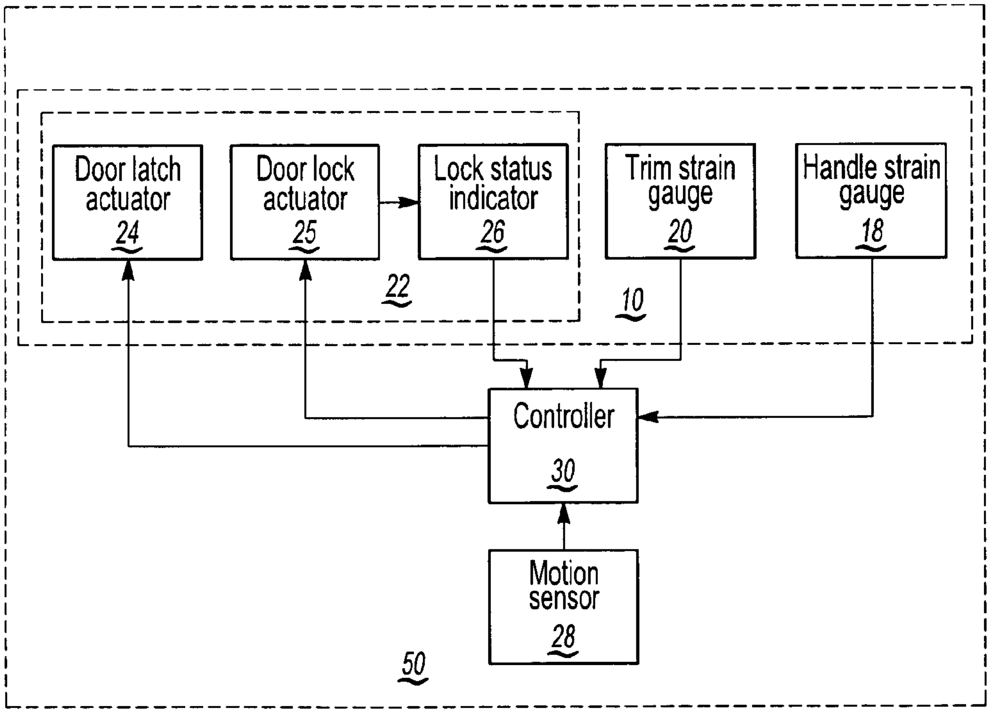
FIG. 2 is a schematic view of a vehicle incorporating the mechanism of the present invention.

Turning now to FIG. 2, a vehicle 50 incorporating door 10 is illustrated schematically. At the heart of the door release mechanism is a controller 30 which may be a standalone microprocessor incorporated into the door 10 or, as this embodiment, is an overall vehicle ICU that is conventionally located under the bonnet (hood) of the vehicle and is also tasked with controlling other vehicle functions (not shown). The controller receives inputs from the handle and trim strain gauges 18 and 20 as well as an input from the door lock status indicator 26 regarding the current locking status of latch 22.

A vehicle motion sensor 28 such as a radar speed detector or the like provides a further input to the controller 30 when the vehicle 50 is travelling in excess of a predetermined speed (e.g. 3 km/h).

In response to the inputs from the aforesaid components, the controller determines the appropriate state of the door latch 22 and signals a power door latch actuator 24 and/or door lock actuator 25 accordingly. The door lock actuator 25 is capable of communicating its current lock state to lock status indicator 26. It should be appreciated that similar components and inter connections may be provided for each door provided on the vehicle, and that individual controllers may be provided for each door, or a single controller 30 may control the function of all doors.

For the avoidance of doubt, following terms relating to latch locking states are now defined:

A latch is in an unlocked security condition when operation of an inside release means or an outside release means causes unlatching of the latch.

A latch is in a locked security condition when operation of an outside release means does not unlatch the latch but operation of an inside release means does unlatch the latch.

A latch is in a superlocked security condition where operation of an outside or an inside release means does not unlatch the latch. In particular it should be noted that multiple operations of the inside and outside release means, in any sequence, does not unlatch the latch.

A latch is in a child safety on security condition when operation of an inside release means does not unlatch the latch but operation of an outside release means may or may not unlatch the latch depending on whether the latch is an unlocked or locked condition.

Override unlocking is a function whereby operation of an inside release means, with the latch in a locked condition, causes unlocking of the latch.

Note that override unlocking is applicable to a latch in a locked child safety off condition, and is also applicable to a latch in a locked child safety on condition. In particular starting from a locked child safety on condition of a latch having override unlocking, an actuation of the inside release means will unlock the door, but this operation or any subsequent operation of the inside release means will not unlatch the door since the child safety feature is on. Nevertheless, once the latch has been unlocked by actuation of the inside release means, a subsequent operation of the outside release means will unlatch the latch. In particular it should be noted that this situation is different from a superlocked latch since in the former case a particular sequence of release means operations, i.e. operation of the inside release means followed by operation of the outside release means, will unlatch the latch. This is not the case for superlocking.

One pull override unlocking is a function whereby with the latch in a locked child safety off condition a single actuation of the inside release means results in unlocking of the door and also unlatching of the door.

Two pull override unlocking is a function, whereby with the latch in a locked child safety off condition a first actuation of the inside release means results in unlocking of the latch but does not result in unlatching of the latch. However, a further operation of the inside release means will then cause the latch to unlatch.

This embodiment, the latch 22 has a child safety function and one a pull override unlocking function, although in other embodiments, the child safety function may be omitted (e.g. for front driver doors) and the latch may have two pull override unlocking.

Figure 3:
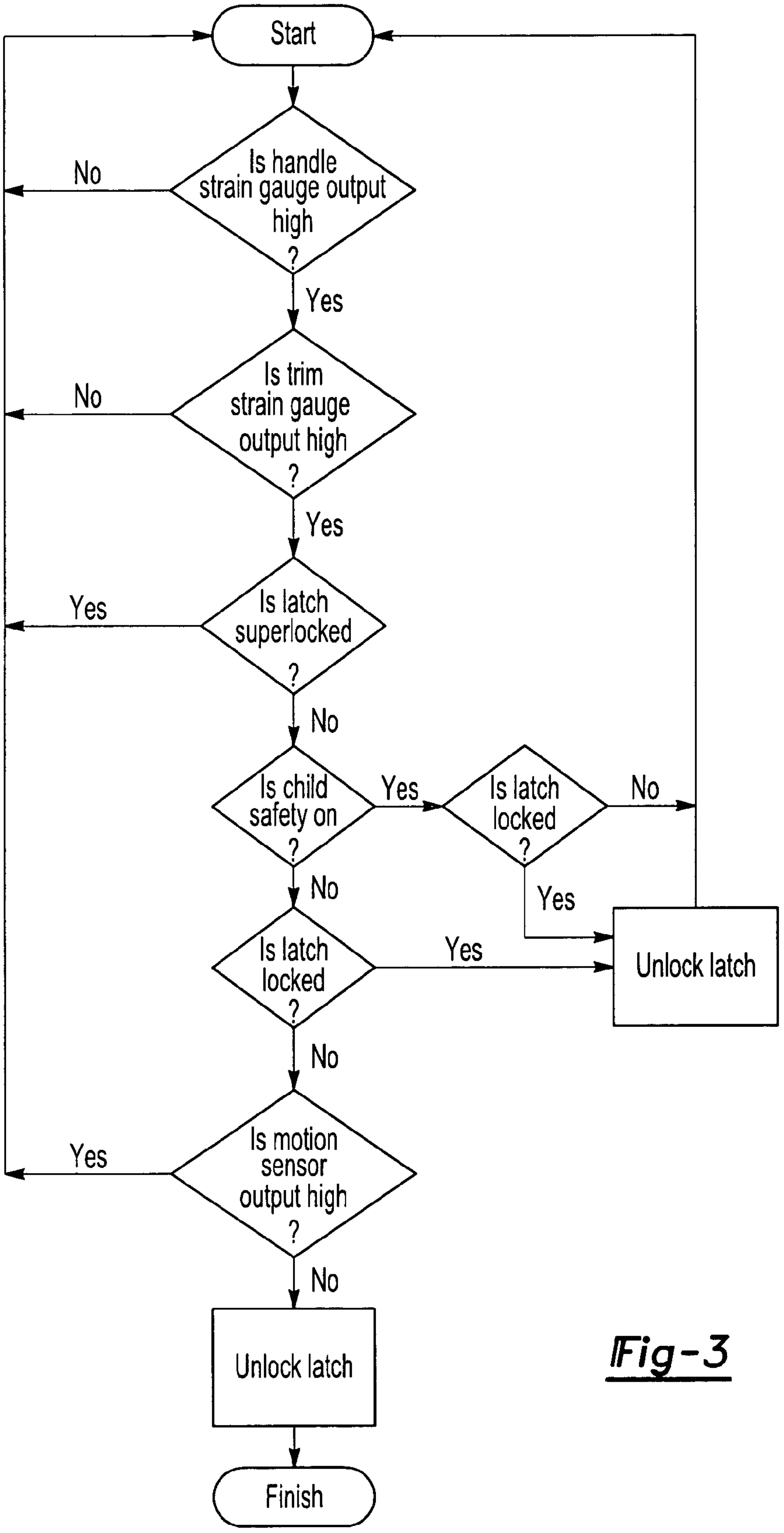
FIG. 3 is a flow chart illustrating the functioning of the mechanism of the present invention.

The operation of the mechanism is as illustrated by the flow chart of FIG. 3. In use, a user seated in the vehicle grasps handle 16 and rests his/her forearm along arm rest 14. Then, by applying an inwardly directed tensile force to handle 16 and an outwardly directed compression force to strain gauge 20, output signals from both gauges are simultaneously sent to controller 30. If both signals exceed a predetermined threshold value, the controller 30 then goes on to determine the locked state of latch 22 from lock status indicator 24. If the latch is superlocked, no unlatching signal is sent to door latch actuator 24. If child safety is on and the latch is locked, the controller 30 signals the door lock actuator 25 to unlock the latch 22 but not to unlatch it. The door lock actuator 25 signals the lock status indicator 26 to provide an update of its status. Only if the latch 22 is locked or unlocked and the output from the motion sensor 28 is low will unlatching occur. The controller 30 sends the appropriate signal to the door latch actuator 24 in order to achieve this.

In alternative embodiments, a memory may be associated with the controller 30 to store the current lock status and door lock status indicator 25 may be omitted.

Thus, is apparent that the arrangement of the strain gauges 18 and 20 substantially prevents the accidental unlatching of latch 22 and that in a preferred embodiment, vehicle occupant safety is further enhanced by integrating a motion sensor into the mechanism so as to prevent accidental unlatching whilst the vehicle is in motion.

Note that the orientations such an "inner" and "outer" as referred to herein relate to orientations of a door when installed in a vehicle. Nevertheless, such terms should not be construed as limiting.

It is envisaged that numerous changes may be made within the scope of the present invention. For example, alternative input means, such as switches, force transducers or even a mechanical linkage but may be provided in place of the strain gauges. The positioning of the input means may be altered. For example, one gauge may be provided on the handle so that an output is generates when it is squeezed.

The invention claimed is:

1. An inside door release mechanism for a vehicle comprising first and second input means arranged to be mounted in a mutually laterally spaced relationship on a door inner face and an output to a latch wherein the mechanism is so constructed and arranged to be capable of causing the latch to be unlatched only when both input means are actuated simultaneously, and the mechanism includes a controller arranged so as to receive signals from the input means, and to determine whether to signal the unlatching of the latch in response thereto.

2. A mechanism according to claim 1 wherein the at least one of the first and second input means comprise a strain gauge or force transducer.

3. A mechanism according to claim 1 wherein the at least one of the first and second input means comprise a switch.

4. An inside door release mechanism for a vehicle comprising first and second input means arranged to be mounted in a mutually spaced relationship on a door inner face of a door and an output to a latch wherein the mechanism is so constructed and arranged to be capable of causing the latch to be unlatched only when both input means are actuated simultaneously, the mechanism includes a door pull handle fixed against movement relative to the door, and the first input means is operably connected to the door pall handle.

5. A mechanism according to claim 4 wherein the first input means mounts the pull handle to the door inner face.

6. A mechanism according to claim 4 wherein a second of said input means is mounted on a substantially planar portion of the inner face of the door.

7. A mechanism according to claim 6 wherein the second input means is arranged such that, in use, the elbow and or lower arm portion of a user located in the vehicle may contact the second input means whilst simultaneously grasping the pull handle.

8. A mechanism according to claim 1 wherein the mechanism includes a vehicle motion sensor arranged such that signals therefrom prevent unlatching whilst the vehicle is in motion.

9. An inside door release mechanism for a vehicle comprising first and second input means arranged to be mounted in a mutually laterally spaced relationship on a door inner face and an output to a latch wherein the mechanism is so constructed and arranged to be capable of causing the latch to be unlatched when both input means are actuated simultaneously wherein the mechanism includes a controller arranged so as to receive signals from the input means, and to determine whether to signal the unlatching of the latch in response thereto.

10. A mechanism according to claim 9 wherein the controller is capable of signalling a power door latch actuator of the latch to effect unlatching.

11. A mechanism according to claim 9 wherein the controller is further capable of receiving an put from a lock status indicator of the latch.

12. A mechanism according claim 9 wherein the controller is capable of signalling a power door lock actuator of the latch so as to change the lock state of the latch.

13. A mechanism according to claim 1 wherein the mechanism is incorporated in a door.

14. A mechanism according to claim 9 wherein the controller is arranged so as to determine the locked state of the latch from a lock status indicator if the signals received from the first and second input means exceed a predetermined threshold value.

* * * * *